United States Patent [19]

Rifi

[11] 4,025,473
[45] May 24, 1977

[54] PROCESS FOR PRODUCING WATER-DILUTABLE COATING COMPOSITIONS

[75] Inventor: Mahmoud Rashad Rifi, Kendall Park, N.J.

[73] Assignee: Union Carbide Corporation, New York, N.Y.

[22] Filed: Mar. 26, 1975

[21] Appl. No.: 562,138

[52] U.S. Cl. .............................. 260/19 R; 260/29.3; 260/32.6 R
[51] Int. Cl.² ...................... C09D 3/54; C09D 5/02
[58] Field of Search .......................... 260/19 R, 29.3

[56] References Cited

UNITED STATES PATENTS

| | | | |
|---|---|---|---|
| 3,230,162 | 1/1966 | Gilchrist | 204/180 P |
| 3,351,675 | 11/1967 | Gilchrist | 260/29.3 |
| 3,444,112 | 5/1969 | Koga et al. | 260/19 R |
| 3,537,969 | 11/1970 | Jerabek et al. | 204/181 |
| 3,796,770 | 3/1974 | Daimer et al. | 260/29.3 |
| 3,867,323 | 2/1975 | Rifi | 260/19 R |

*Primary Examiner*—Ronald W. Griffin
*Attorney, Agent, or Firm*—Aldo John Cozzi

[57] ABSTRACT

There is disclosed a process for producing water-dilutable coating compositions by subjecting a reaction mixture containing a phenolic resin and either a drying or semi-drying oil and an alpha, beta-ethylenically unsaturated carboxylic acid anhydride, or an adduct thereof, and a secondary or tertiary amine catalyst, to an elevated temperature for a period of time sufficient to produce a ternary adduct. Said ternary adduct is reacted with water and neutralized to produce a water-dilutable coating composition. The application also discloses a one-stage reaction for the production of a ternary adduct of tung oil, alpha, beta-ethylenically unsaturated carboxylic acid anhydride, and phenolic resin.

10 Claims, No Drawings

PROCESS FOR PRODUCING WATER-DILUTABLE COATING COMPOSITIONS

The invention relates to a process for the production of water-dilutable coating compositions.

The preparation of water-dilutable coatings compositions from "maleinized" drying oils and phenolic resins has been disclosed. For instance, see A. E. Gilchrist, U.S. Pat. Nos. 3,230,162; 3,351,675 and 3,362,899; Jerabek et al., U.S. Pat. No. 3,537,969; and Koga et al., U.S. Pat. No. 3,444,112. See also Rifi, U.S. Pat. No. 3,867,323.

In a first aspect, the present invention is based upon the discovery that secondary or tertiary amines can act as catalysts to significantly accelerate the reaction between a phenolic resin and the anhydride moieties of a maleinized drying oil. Accordingly, in this aspect the invention provides a process for producing a water-dilutable coatings composition which comprises the steps of:

a. subjecting a reaction mixture containing a phenolic resin and either (i) an adduct of a drying or semi-drying oil and an alpha, beta-ethylenically unsaturated carboxylic acid anhydride, or (ii) a drying or semi-drying oil and an alpha, beta-ethylenically unsaturated carboxylic acid anhydride, and a catalytically effective quantity of a secondary or tertiary amine, to an elevated temperature for a period of time sufficient to product a ternary adduct of said phenolic resin, said drying or semi-drying oil, and said anhydride;

b. reacting said ternary adduct with water to insure that substantially all carboxylic acid anhydride groups contained in said ternary adduct are converted to free carboxyl groups; and c. neutralizing the product of step (b) with sufficient base to produce a water-dilutable coating composition.

In a second aspect, the invention provides a one-stage reaction for the preparation of water-dilutable coating compositions from tung oil, phenolic resin, and an alpha, beta-ethylenically unsaturated carboxylic acid anhydride. This reaction may either be catalyzed in accordance with the first aspect of the invention, or it may be uncatalyzed. The sole significant difference between the catalyzed reaction and the uncatalyzed reaction is the reaction rate. The products appear to be identical in all significant respects.

An alpha, beta-unsaturated carboxylic acid anhydride is employed in the invention. While maleic anhydride is highly preferred for economic reasons, any alpha, beta-unsaturated carboxylic acid anhydride can be employed. Thus, while the terms "maleic anhydride", "maleinized oil", and the like will be employed herein for brevity, it is important to remember that maleic anhydride is not the only such anhydride that can be employed.

The oil that is employed in the first aspect of the invention can be a natural product such as linseed oil, tung oil, soybean oil, fish oil, cottonseed oil, oiticica oil, perilla oil, sunflower seed oil, dehydrated castor oil, tall oil, safflower oil, or other naturally occurring oil which comprises the ester of an alcohol, usually glycerine, and an ethylenically unsaturated fatty acid. Alternatively, the oil can be the reaction product of an ethylenically unsaturated fatty acid, or preferably a mixture of such fatty acids derived from a naturally occurring drying or semi-drying oil, with a precursor compound such as a polyol, a polyepoxide, or an epoxy-alcohol.

The nature and preparation of such compounds are known in the art. When reacting the ethylenically unsaturated fatty acid with a precursor compound, it is preferred to employ at least one equivalent of ethylenically unsaturated fatty acid per hydroxyl equivalent of the precursor compound. By the term "hydroxyl equivalent", is meant the equivalents of hydroxyl groups in the precursor compounds plus twice the number of equivalents of epoxy groups, since the initial reaction between the ethylenically unsaturated fatty acid and the epoxide group generates a hydroxyl group, which also must be esterified. The reason for this is that any hydroxyl groups present in the oil will destroy the anhydride groups of the anhydride when oil is reacted with the anhydride. Although a small amount of hydroxyl groups can be tolerated, and in many cases there will be a small percentage of such hydroxyl groups present, the presence of significant amounts of hydroxyl groups will destroy significant amounts of the anhydride groups in the anhydride, and thereby lessen the proportion of anhydride groups that are subsequently available for reacting with the phenolic resin.

When the oil is the reaction product of an ethylenically unsaturated fatty acid and a precursor compound, it is preferred that the precursor compounds containing sterically hindered hydroxyl groups in order that the cured coating composition that is produced by the invention be less prone to hydrolysis. Sterically hindered hydroxyl groups are generated by epoxide groups, and also, secondary alcoholic hydroxyl groups and tertiary alcoholic hydroxyl groups are sterically hindered. Another useful sterically hindered group is a neopentyl hydroxyl group, that is, a methylol having a tri-substituted alpha carbon atoms. The nature and production of such precursor compounds are well known to the art. Among the precursor compounds that can be employed for reaction with an ethylenically unsaturated fatty acid are epoxides, such as the diglycidyl diether of bisphenol-A and higher condensation products of this series, other polyglycidyl polyethers of polyhydric phenols, aliphatic polyepoxides such as 3,4-epoxycyclohexylmethyl 3,4-epoxycyclohexanecarboxylate, vinyl cyclohexene dioxide, and bis(2,3-epoxycyclopentyl)ether, and epoxy alcohols such as the compound of the formula:

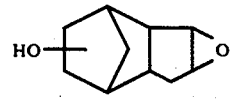

Other precursor compounds that can be employed to react with an ethylenically unsaturated fatty acid are alcohols, preferably polyhydric alcohols, such as ethylene glycol, glycerol, 1,2,6-hexanetriol, pentaerythritol, 2,2,4,4-tetramethyl-1,3-cyclobutanediol, 2-hydroxyl-1,1-dimethylethyl 4-hydroxy-3,3-dimethylbutanoate, and other polyhydric alcohols.

The ethylenically unsaturated fatty acids that are employed for producing the oil are generally $C_8$ to $C_{20}$ fatty acids containing one or more ethylenically unsaturated groups. A small percentage of saturated fatty acids may also be employed. The ethylenically unsaturated fatty acids that may be employed, either singly or preferably in mixtures thereof, include, but are not limited to, oleic acid, linoleic acid, linolenic acid, ricinoleic acid, licanic acid, eleostearic acid, palmitoleic acid, erucic acid, elaidic acid, and brassidic acid.

In the second aspect of the invention, the oil employed is tung oil or a similar synthetic or natural drying oil that contains a significant proportion of conjugated olefinic unsaturation.

The next reactant that is employed in both aspects of the invention is a phenolic resin. As is well known in the art, phenolic resins are condensation products of phenols with an aldehyde, preferably formaldehyde. The condensation reaction is carried out in the presence of a basic catalyst, if a resole is to be produced, or in the presence of an acidic catalyst, if a novolak is to be produced. Among the phenols that can be employed to produce the phenolic resin, either singly or in mixtures thereof, there can be mentioned phenol (that is, monohydroxybenzene), and preferably para-substituted phenols such as para-tertiary-butylphenol, para-phenylphenol, parachlorophenol, para-alkoxy phenol, and the like. Generally, the para substituent will have up to about 10 carbon atoms, and is selected for the purpose of imparting oil-compatability to the phenolic resin.

The proportions in which the reactants are employed are not narrowly critical. The exact proportions selected will vary from one coating composition to another, keeping the following principles in mind. The anhydride is employed in the invention for several reasons. First, it is employed to provide a reaction site to ensure chemical bonding between the oil and the phenolic resin. Further, it is employed to provide free carboxylic acid groups that can be neutralized with a base to provide water-dilutability of the coating composition. Other factors to be considered in selecting the specific proportion of the anhydride are the proportion of phenolic resin that is to be employed, the presence or absence of other free carboxylic acid groups in the oil, and the like. It has been found, in general, that foregoing objectives are accomplished if the anhydride is employed in amounts of from about 1 to about 20 weight percent, based on weight of oil.

The phenolic resin is employed in the invention for several reasons. First, it is employed because it imparts improved corrosion resistance to the coatings composition. When the coating composition is employed in electrocoating applications, the presence of the phenolic resin improves throwing power, and permits a higher operating voltage to be employed because the breakdown voltage of the varnish will be higher. Too much phenolic resin may cause poor impact resistance, and may cause excessively high viscosity in the varnish. Therefore, with these considerations in mind, it has been found that a proportion from about 10 to about 50 weight percent, based on weight of maleinized oil (that is, oil plus anhydride), will generally accomplish the objectives of the invention.

In the case where anhydride is reacted with the oil prior to the reaction with the phenolic resin, this addition reaction is carried out under known conditions. It is carried out at a temperature and for a period of time sufficient to effect an addition reaction between the oil and the ethylenic double bond contained in the anhydride. In general, the reaction between the anhydride and the oil is carried out at a temperature within the range of from about 150° to about 250° C., for a period of from about 1 to about 3 hours. It is often desirable to carry out this reaction under an inert atmosphere, such as under nitrogen. During and after the addition of the anhydride to the oil, the reactants should be kept as dry as practicable in order to preserve the anhydride moieties, until after the phenolic resin has had a chance to react with said anhydride moieties.

The next material that is employed in the first aspect of the invention is a secondary or tertiary amine catalyst. Such catalysts include triethylamine, 1,4-diazabicyclo[2.2.2]octane, tetramethylguanidine, diisopropyl amine or other tertiary or secondary amine that is free of groups that will react with any of the reactants under the conditions of the reaction.

As a general rule, the secondary or tertiary amines that are particularly useful in the invention have $pK_b$ values of about 5 or lower.

The secondary or tertiary amine catalyst is employed in catalytically effective amounts. For instance, it has been found that portions of from about 0.02 to about 0.5 weight percent, based upon weight of maleinized oil plus phenolic resin, have yielded desirable results.

The particular reaction which constitutes the principal novelty of the first aspect of the invention is the reaction between phenolic resin and either a maleinized oil or an oil plus unsaturated anhydride, wherein the reaction mixture contains the secondary or tertiary amine catalyst. The presence of the catalyst permits this reaction to be carried out either at a lower temperature, or for a shorter period of time, or both, than is the case with the uncatalyzed reaction. The particular temperature selected is not narrowly critical, but will vary within certain limits, depending upon factors such as the nature of the oil, the nature of the phenolic resin, and the like. For instance, if a novolak resin is employed, a slightly higher temperature is used than if a resole is employed. For instance, when novolaks are employed, a temperature within the range of from about 145° C. to about 200° C. will normally give desirable results. And when the phenolic resin is a resole, a temperature within the range of from about 100° C. to about 140° C. will ordinarily give the desired results. When the temperatures indicated above are employed, the reaction time will normally be within the range of from about 2 to about 8 hours.

The evidence strongly suggests that the particular reaction that is accelerated by the catalysts of the invention is the reaction between the phenolic resin and the carboxylic acid anhydride group of the maleic anhydride. For instance, it has been found that the catalyst has no significant effect on the rate of the reaction between maleic anhydride and tung oil. When a novolak is used as the phenolic resin, the reaction is between the phenolic hydroxyls of the novolak and the anhydride group. When a resole is used, the methylol groups of the resole are the predominant reacting groups.

If step (a) of the process of the invention is to be carried out in one stage (i.e., with the reaction mixture containing drying oil, maleic anhydride, and phenolic resin as the initial reactants, as opposed to maleinized oil and phenolic resin), then it is highly preferred that the oil be one such as tung oil that contains a significant proportion of conjugated unsaturation. If a drying oil containing little or no conjugated unsaturation is used, apparently the reaction between the phenolic resin and the maleic anhydride to form an ester, is faster than the reaction between the oil and the anhydride. The esterified maleic then reacts with the oil only with difficulty, perhaps because of steric hindrance. It is preferred, therefore, to pre-react the oil and the maleic to form a maleinized oil, prior to the reaction with the phenolic resin, when an oil containing little or no conjugated unsaturation is used.

After the reaction(s) between the phenolic resin, the oil, and the maleic anhydride has (have) been completed, enough water is added to the reaction mixture to hydrolize any unreacted anhydride moiety that might be present. The reason for doing this is that the preferred way of forming a water-dilutable varnish composition from this reaction product is to neutralize it with amine. If there are anhydride groups present, however, the neutralizing amine (discussed below) will react with them to form amides which are difficultly soluble in water, instead of the more readily soluble salts that result from the reaction of the amine with a free carboxyl group.

The next step in producing water-dilutable coating compositions in accordance with the invention is to neutralize the ternary adduct with a base. It is not necessary to neutralize all of the carboxylic acid groups that are present in the reaction product. The base is employed in an amount sufficient to impart water-dilutability to the composition. Among the bases that can be employed are amines such as ammonia, lower alkylamines such as triethylamine, alkanolamines such as monoethanolamine, diethanolamine, isopropanolamine, and alkali metal hydroxides such as sodium hydroxide and potassium hydroxide. The reaction of a carboxyl containing oil such as the present one with a base to form a water-dilutable varnish composition is known in the art. As a general rule, from about 50 percent to 100 percent of the free carboxylic acid groups present in the ternary adduct will be neutralized with the base.

In order to insure water-dilutability and stability of resin in water, there is generally employed a co-solvent in the varnish. Such co-solvents include alcohols such as ethyl alcohol, isopropyl alcohol, and n-butanol, glycols such as ethylene glycol, propylene glycol, and diethylene glycol, glycol ethers such as beta-ethoxyethanol, and the like, esters such as ethyl acetate, ketones such as methyl ethyl ketone, and other solvents which are water-miscible and which are also solvents for the ternary adduct. Generally, not more than 20 weight percent of the volatile portion of the coating composition will be an organic co-solvent. This 20 percent limit is an arbitrary standard that has been set by the government for anti-pollution purposes.

The water-dilutable coating compositions can be utilized by procedures that are analogous to the known methods for using water-dilutable coating compositions containing phenolic resins and drying oil. The coating composition can be formulated by known techniques to be applied to a substrate by spraying, dipping, brushing, electrocoating, and the like. Known classes of pigments, driers, and other additives can be used.

The coatings can be applied to metal substrates, as well as other materials. The coating compositions of the invention can be cured by a bake at a temperature within the range of from about 120° to about 200° C., for a period of from about 10 to about 30 minutes. The bake is, of course, carried out in air or other oxidizing atmosphere, and cure is effected by the conventional drying reaction of the oil.

The following Examples illustrate the invention:

EXAMPLE 1

A coatings composition is prepared from the following components:

|  | Parts, By Weight | Weight Per Cent |
|---|---|---|
| Tung oil | 300 | 47.82 |
| Maleic Anhydride | 40 | 6.37 |
| Novolak A[1] | 159 | 25.34 |
| Triethylamine | 0.35 | 0.06 |
| Water | 18 | 2.87 |
| Butyl "CELLOSOLVE"[2] | 110 | 17.53 |

[1]Novolak A is the acid-catalyzed condensation product of 5 moles of p-t-butylphenol with 4 moles of formaldehyde.
[2]The monobutyl ether of ethylene glycol.

The generalized procedure for producing the coatings composition is as follows:

1. Charge tung oil, maleic anhydride, novolak, and triethylamine to reaction vessel, and begin heating to increase temperature to 165° C. (At about 75° C., an exotherm will occur) When a solution is obtained, remove sample for viscosity measurement[3].

[3]Gardner viscosities are measured as 60 percent resin in xylene, percent being based on weight of resin plus xylene.

2. Continue heating with agitation and remove sample for viscosity measurement every 30–40 minutes.

3. When desired Gardner viscosity is attained, cool reaction mixture to below about 110°–120° C., and add water. A Gardner viscosity of about N-O is a good target when the phenolic resin is a novolak. When a resole is used, it may be desirable to aim for a slightly lower viscosity (e.g., L-M), in order to avoid gelation.

4. Stir for 30 minutes, than add butyl CELLOSOLVE, stir for 30 more minutes, and discharge. The resulting product can then be neutralized with an amine, and then can be diluted with water to form a composition suitable for use in coating application.

Table I, below, displays the Gardner viscosity vs. time for resins produced in accordance with the above procedure, one produced under a nitrogen atmosphere and one produced using air as the atmosphere. The reaction rates of these two resins were substantially identical. These two runs are compared with a third, produced under identical conditions except that no catalyst was employed. These data illustrate the significant increase in reaction rate that is obtained when the tertiary amine catalyst is used.

TABLE I

| Viscosity vs. Reaction Time | | | |
|---|---|---|---|
| | Gardner Viscosity | | |
| | With Catalyst | | No Catalyst |
| Time, hrs. | N₂ | Air | |
| 0.5 | D | E | B+ |
| 1.5 | G | G | — |
| 2.5 | I+ | J | C |
| 3.5 | K+ | M | |
| 4 | N | N | C |
| 4.5 | — | — | C+ |

EXAMPLE 2

By a procedure analogous to that described in Example 1, and using the same proportion of reactants, a series of coatings compositions were made using the following proportions of triethylamine catalyst:

| | Amount of Catalyst | |
|---|---|---|
| Run No. | Parts, by Weight | Per Cent[4] |
| 1 | 0.15 | 0.030 |

-continued

| Run No. | Amount of Catalyst | |
|---|---|---|
| | Parts, by Weight | Per Cent[4] |
| 2 | 0.2 | 0.040 |
| 3 | 0.37 | 0.074 |
| 4 | 0.43 | 0.086 |
| 5 | 1.55 | 0.31 |

[4]Per cent based on weight of maleinized oil plus phenolic resin.

Gardner viscosity vs. time for the five runs is displayed in Table II.

TABLE II

Reaction Time vs. Gardner Viscosity

| Time, hrs. | Parts of Catalyst | | | | |
|---|---|---|---|---|---|
| | Gardner Viscosity | | | | |
| | 0.15 | 0.2 | 0.37 | 0.43 | 1.55 |
| 0.5 | — | — | B+ | B+ | C |
| 1 | B+ | C | — | — | — |
| 2 | — | — | F+ | F+ | — |
| 3 | F | G+ | I+ | — | O |
| 3.5 | — | — | — | K | — |
| 4 | H+ | — | — | — | — |
| 4.5 | — | — | N | O | — |
| 5 | — | L | — | — | — |
| 6 | L | — | — | — | — |

EXAMPLE 3

By a procedure analogous to that described in Example 1, except that the reaction temperature was maintained at about 135°–140° C., two ternary adducts were produced from the following components:

| | Parts, by Weight | |
|---|---|---|
| | Run No. 1 | Run No. 2 |
| Tung Oil | 375 | 375 |
| Maleic Anhydride | 57 | 57 |
| Resole A[5] | 198 | 198 |
| Triethylamine | 0.44 | — |

[5]Resole A is produced by reacting 1 mole of p-t-butylphenol with 4 moles of formaldehyde in the presence of sodium hydroxide catalyst.

Table III, below, displays the Gardner viscosities after various reaction times of these two runs.

TABLE III

Gardner Viscosity vs. Reaction Times

| Time, hrs. | Gardner Viscosity | |
|---|---|---|
| | Run No. 1 | Run No. 2 |
| 0.5 | A− | A− |
| 2.5 | J+ | — |
| 3 | — | B |
| 4.5 | Gelled | — |
| 5 | — | F |
| 7 | — | J |

This Example demonstrates that the tertiary amine catalysts are effective in accelerating the reaction between a resole and the carboxylic acid anhydride group. When using the catalyst, the reaction should be sampled for viscosity analysis more frequently than was done to Run No. 1.

EXAMPLE 4

This Example presents illustrative formulations for various types of coatings, utilizing as the base resin a tung oil/maleic anhydride/novolak ternary adduct (referred to herein as "Base Resin") substantially identical to the one described in the first two runs of Example 1 (i.e., the two runs utilizing the tertiary amine catalyst), or the novolak-based resin of Example 5, below. All parts are by weight unless otherwise specified.

A. Neutralization and Water Dilution of Base Resin

In order to make the Base Resin water soluble (or dilutable), it must be neutralized with a base. The amount of Base Required can be calculated as follows:

$$\text{gms. of base} = \frac{(\text{Weight of Resin})(.82)(.6)(.90)(\text{Mol. Wt. of base})}{56.1 \times 1000}$$

Thus, the base is added to the Base Resin with stirring, followed by the addition of the appropriate amount of water to give the desired percent solid. Examples of bases are ammonia, alkyl amines, or alkanol amines. Alkali metal base can also be used.

B. Clear Varnish (Air-Dry)

| | |
|---|---|
| Base Resin (50% Solid) | 250 |
| (neutralized with dimethylethanol amine) | |
| Driers | |
| Lead (24%) | 1.4 |
| Cobalt (6%) | 1.0 |
| Manganese | 1.0 |

Procedure

The driers are added slowly to the resin with stirring, and the product is allowed to age overnight. Application of the paint by brushing is quite satisfactory at this percent solid. For spray application, the varnish is reduced to about 35 percent solid by adding water.

| Properties of Paint | |
|---|---|
| pH | 8.5–9.0 |
| Total Solids, percent | 35–50 |
| Shelf Stability | >1 year |
| Drying Time to Touch | <30 min. |
| Salt Spray Resistance | >500 hrs. |
| (cold rolled steel 1.5 mil) | |
| air-dried 2 weeks) | |
| Note: The brush used in this application is | |
| easily cleaned with tap water. | |

C. Pigmented Varnish (Air-Dry)

| | |
|---|---|
| Base Resin | 250 |
| (50% solid neutralized with | |
| dimethylethanol amine) | |
| Red Iron Oxide (Napico) | 25 |
| Zinc Phosphate | 100 |
| (Reichard Coulston, N.Y. No. 317) | |
| Driers | |
| Lead (24%) | 1.4 |
| Cobalt (6%) | 1.0 |
| Manganese (6%) | 1.0 |
| Tamol 731 (Rohm & Haas)[6] | 5.0 |
| Balab 748 (Rohm & Haas)[7] | 2.5 |
| Acrysol ASE-60 (Rohm & Haas)[8] | 1.25 |
| Water | 130.00 |
| | 517.15 |

[6]Tamol 731 - a non-ionic surfactant used to wet the pigments.
[7]Balab 748 - a de-foamer.
[8]Acrysol ASE-60 - an acrylic thickener, used as a viscosity control agent.

Procedure

Using a high speed stirrer, e.g., a Cowles dissolver, the red iron oxide and zinc phosphate are added to the neutralized Base Resin. This is followed by the addition of Tamol, Balab, Acrysol, and about 50 ml. water. The paint is allowed to cool to room temperature (heat is generated when using the Cowles dissolver as a stirrer), and the driers are added. This is followed by the addition of the remaining amount of water.

| Properties of Paint | |
|---|---|
| pH | 8.5–9.0 |
| P/B (pigment to binder) | 1.0 |
| Total solids | 48.43% |
| Viscosity (Ford Cup No. 4) | ~35 sec. |
| Shelf Stability | >6 months |
| Drying Time to Touch | <30 minutes |
| Salt Spray (1.5 mil over cold rolled steel, air-dried 2 weeks) | >300 hrs. |
| D. Appliance Primer | |
| Base Resin (89.9% Solid) | 500 |
| Dimethylethanol amine | 58 |
| TiO$_2$ (20/20) | 100 |
| Zinc Phosphate | 100 |
| Cymel 303[10] | 40 |
| Driers | |
| Lead (24%) | 5.3 |
| Cobalt (6%) | 4.0 |
| Manganese (6%) | 2.6 |
| Water | 4000.0 |

[10]Cymel 303 is the hexamethyl ether of hexamethylolmelamine.

Procedure

The Base Resin is neutrallized with the amine using a Cowles dissolver. This is followed by the addition of TiO$_2$ and zinc phosphate. Upon good mixing, the temperature of the product is allowed to drop to ~30° C., and the driers and Cymel 303 are added. This is followed by the addition of water to bring the solid concentration to about 11 percent.

The paint is applied onto Bonderite 100 via electrocoating to give a film thickness after baking at 325° F./20 min. of 0.6 mil.

Properties:

| Detergent Resistance (1.5 Tide at 165° F.) | ~300 hrs. |
|---|---|
| Salt Spray | ~1000 hrs. |

| E. Automotives: Primer/Guide Coat | |
|---|---|
| Grind: | |
| Zinc Phosphate | 200 |
| Barytes No. 1 (Barium sulfate) | 666 |
| Asbestene 325 (asbestos) | 216 |
| Red Iron Oxide | 166 |
| Tamol 731 | 42 |
| Balab 748 | 21 |
| Water | 400 |
| Grind is prepared in a ball mill overnight. | |
| Let-Down | |
| Base Resin (82.5% Solid) | 194 |
| Triethanol amine | 24.4 |
| Cymel 303 (American Cyanamid) | 15.0 |
| Bakelite ERL-4221[11] | 15.0 |
| Butyl CELLOSOLVE | 20.0 |
| Water | 200.0 |

[11]ERL-4221 is a compound of the formula:

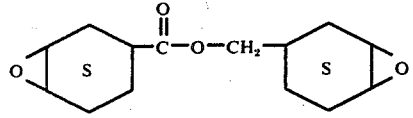

Procedure

The Base Resin is neutrallized using a Cowles dissolver. Thus, triethanolamine is added to the Base Resin, followed by the addition of Cymel 303 and Bakelite ERL-4221 dissolved in butyl CELLOSOLVE. At this point, the grind is added, followed by the slow addition of water.

Properties of Paint

The paint can be thinned with water to a Ford Cup Viscosity of 13–18 sec. and sprayed on Bonderite 100 or 37. The film thickness was about 1 mil after a bake cycle of 300° F./20 min.

| pH | 8 |
|---|---|
| P/B | 2 |
| Ford Cup No. 4 | 13 |
| Adhesion to Metal | Excellent |
| Sandability | Excellent |
| Salt Spray | 1000 hrs. |
| Impact F/R | 30/25 |
| F. Can Coating | |
| Base Resin (82% Solid) | 500.0 |
| Dimethylethanolamine | 40.0 |
| Water | 1000.0 |

Procedure

The Base Resin is neutralized with dimethylethanolamine, and diluted with water to about 35 percent solid. The coating on tin free steel and electrolytic tin plate is applied by (a) a direct roller coating, (b) spray coating, or (c) electrocoating. At a film thickness of ~0.3 mil, after a bake cycle of 375–400 of 4–6 min., the coating properties are as follows:

| Pasteurization 45 min. at 170° F. | Pass |
|---|---|
| Sterilization 90 min. at 250° F. | Pass |

The coating also has a very good flexibility.

EXAMPLE 5

This Example illustrates the "one-stage" production of a water-dilutable ternary tung oil/phenolic resin/maleic anhydride adduct, prepared without using catalyst.

| Tung Oil/Maleic Anhydride/Novolak A | | |
|---|---|---|
| | Parts | Percent, By Weight |
| Tung Oil | 2300 | 48.72 |
| Maleic Anhydride | 350 | 7.42 |
| Novolak A | 1220 | 25.85 |
| Water | 150 | 3.18 |
| Butyl CELLOSOLVE | 700 | 14.83 |
| | 4720 | 100.00 |

Procedure

Into a reaction vessel equipped with a mechanical stirrer and a thermometer, there was added simultaneously, tung oil, maleic anhydride, and Novolak A. The temperature of the mixture was raised to 175° C. and held until the Gardner viscosity of the product, as measured 60 percent resin in xylene, was about M-N.[12] At this time, the temperature is allowed to drop to 120° C. and the water is added. The product is allowed to stir for 30 min. and then the butyl CELLOSOLVE is added. After 30 min. of stirring, the product, which 82 percent solid, is discharged into an appropriate container.

[12]The reaction time is about 8–9 hours. If the temperature is increased to 200°–220° C., the reaction time is about 4–5 hours.

| Tung Oil/Maleic Anhydride/Resole A | | |
|---|---|---|
| | Parts | Percent, By Weight |
| Tung Oil | 2300 | 48.72 |
| Maleic Anhydride | 350 | 7.42 |
| Resole A | 1220 | 25.85 |
| Water | 150 | 3.18 |
| Butyl CELLOSOLVE | 700 | 14.83 |
| | 4720 | 100.00 |

Procedure:
Same as above except, reaction temperature is 120°–130° C.

EXAMPLE 6

Following the same general procedure described in Example 1, a ternary adduct was produced from the following components:

| | Parts By Weight |
|---|---|
| Tung Oil | 230 |
| Maleic Anhydride | 35 |
| Novolak A | 122 |
| Tetramethylguanidine | 1.0 |

At 170° C., a Gardner viscosity of "R" was reached in ½ hour. The experiment was repeated, using one-fourth as much tetramethylguanidine (i.e., 0.25 part). The viscosity after various reaction times at 170° C. is shown in Table IV:

TABLE IV

| Reaction Time vs. Gardner Viscosity | |
|---|---|
| Time, hrs. | Gardner Viscosity |
| 1.0 | E |
| 1.25 | F |
| 1.5 | G |
| 2.5 (shut down for night) heated to 170° C. | G |
| 6.5 | I |
| 9.5 | N |

The product was reacted with water, and then neutralized with 28 parts of dimethylethanolamine. 70 Parts of butyl CELLOSOLVE was then added, and the product was discharged.

Control

An adduct was made from tung oil, Novolak A, and maleic anhydride, by a procedure analogous to that described in the Examples of Koga et al., U.S. Pat. No. 3,444,112. The following ingredients:

| | Parts, By Weight |
|---|---|
| Tung oil | 200 |
| Novolak A | 160 |
| Maleic anhydride | 40 | were charged to a 1-liter, three-necked flask equipped with reflux condenser, thermometer, and stirring rod. The heat was turned on, and after about 20 minutes, a temperature of 235° C. was reached. The reaction mixture was held at that temperature for 1 hour, and the heat was turned off. After 35 minutes, the reaction mixture had cooled to 80° C. 220 grams of isopropyl alcohol was then added to the flask over a 9-minute period, after which time the temperature was 62° C. Concentrated aqueous ammonia (40 grams; 29 percent) was then added to the flask within 2 minutes after a-1 the alcohol had been added. The product was stirred for about 1½ hours, and discharged into a 1-gallon jar. Water (520 grams) was then added to the jar, with agitation. A two-phase system was formed. Further stirring did not produce a one-phase system.

This experiment indicates that a water-dilutable composition cannot be produced from tung oil, by using a procedure that is analogous to that shown in the Examples of the Koga et al. patent.

EXAMPLE 5

Example I is repeated using di-isopropylamine as the catalyst. Similar results are obtained.

What is claimed is:
1. A process that comprises the steps of:
   a. reacting, under substantially anhydrous conditions, a phenolic resin with either (i) an adduct of a drying or semi-drying oil and an alpha, beta-ethylenically unsaturated carboxylic acid anhydride, wherein said adduct contains carboxylic acid anhydride moieties, or (ii) a mixture of a drying or semi-drying oil and an alpha, beta-ethylenically unsaturated carboxylic acid anhydride, for a period of time and at an elevated temperature sufficient to produce a ternary adduct of said phenolic resin, said drying or semi-drying oil, and said anhydride;
   b. reacting the product of step (a) with sufficient water to insure that substantially all of the anhydride groups contained in said ternary adduct are converted to carboxylic acid groups; and
   c. neutralizing the product of step (b) with sufficient base to produce a water-dilutable coatings composition,
   wherein the said step (a) is carried out in the presence of a catalytically effective quantity of a secondary or tertiary amine catalyst, said phenolic resin being a resole or a novolak.
2. The process of claim 1 wherein said alpha, beta-ethylenically/unsaturated carboxylic acid anhydride is maleic anhydride.
3. The process of claim 2 wherein said drying oil is tung oil.
4. The process of claim 2 wherein said phenolic resin is a novolak.
5. The process of claim 2 wherein said phenolic resin is a resole.
6. The process of claim 1 wherein step (a) is carried out by reacting phenolic resin with a mixture of tung oil and maleic anhydride.
7. The process of claim 6 wherein the phenolic resin is a novolak.
8. The process of claim 6 wherein the phenolic resin is a resole.
9. A process that comprises the steps of:
   a. reacting, under substantially anhydrous conditions, a phenolic resin, tung oil, and an alpha, beta-ethylenically unsaturated carboxylic anhydride, for a period of time and at an elevated temperature sufficient to produce a ternary adduct of said phenolic resin, said tung oil, and said anhydride;
   b. reacting the product of step (a) with sufficient water to insure that substantially all of the anhydride groups contained in said ternary adduct are converted to carboxylic acid groups; and
   c. neutralizing the product of step (b) with sufficient base to produce a water-dilutable coating composition, said phenolic resin being a resole or a novolak.
10. The process of claim 9 wherein said anhydride is maleic anhydride.

* * * * *